US009040435B2

(12) United States Patent
Kissel et al.

(10) Patent No.: US 9,040,435 B2
(45) Date of Patent: May 26, 2015

(54) SUPERHYDROPHOBIC AEROGEL THAT DOES NOT REQUIRE PER-FLUORO COMPOUNDS OR CONTAIN ANY FLUORINE

(75) Inventors: David J. Kissel, Anoka, MN (US); Charles Jeffrey Brinker, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 1074 days.

(21) Appl. No.: 13/121,166

(22) PCT Filed: Jun. 30, 2009

(86) PCT No.: PCT/US2009/049208
§ 371 (c)(1),
(2), (4) Date: Oct. 28, 2011

(87) PCT Pub. No.: WO2010/002859
PCT Pub. Date: Jan. 7, 2010

(65) Prior Publication Data
US 2012/0040577 A1 Feb. 16, 2012

Related U.S. Application Data

(60) Provisional application No. 61/077,145, filed on Jun. 30, 2008.

(51) Int. Cl.
*C09D 7/12* (2006.01)
*C09D 5/14* (2006.01)
(Continued)

(52) U.S. Cl.
CPC .............. *C09D 7/1225* (2013.01); *C08K 3/36* (2013.01); *C08K 7/26* (2013.01); *C08K 9/06* (2013.01); *C09D 5/14* (2013.01); *C09D 5/1687* (2013.01); *C09D 183/02* (2013.01)

(58) Field of Classification Search
USPC ...................... 442/131, 123, 93, 59
See application file for complete search history.

(56) References Cited

U.S. PATENT DOCUMENTS 7,309,528 B2 12/2007 Clerici et al.
2006/0292345 A1* 12/2006 Dave et al. .................... 428/141

FOREIGN PATENT DOCUMENTS

CN 1724353 A 1/2006
CN 1865136 A 11/2006
(Continued)

OTHER PUBLICATIONS

European Patent Office, Supplementary European Search Report, European Patent Application No. 09774310.8, May 27, 2011, 3 pages.
(Continued)

*Primary Examiner* — Lynda Salvatore
(74) *Attorney, Agent, or Firm* — MH2 Technology Law Group, LLP

(57) ABSTRACT

Provided are superhydrophobic coatings, devices and articles including superhydrophobic coatings, and methods for preparing the superhydrophobic coatings. The exemplary superhydrophobic device can include a substrate component and one or more superhydrophobic coatings disposed over the substrate component, wherein at least one of the one or more superhydrophobic coatings has a water contact angle of at least about 150° and a contact angle hysteresis of less than about 1°. The one or more superhydrophobic coatings can include an ultra high water content acid catalyzed polysilicate gel, the polysilicate gel including a three dimensional network of silica particles having surface functional groups derivatized with a silylating agent and a plurality of pores.

12 Claims, 2 Drawing Sheets

(51) Int. Cl.
*C09D 5/16* (2006.01)
*C09D 183/02* (2006.01)
*C08K 3/36* (2006.01)
*C08K 7/26* (2006.01)
*C08K 9/06* (2006.01)

(56) References Cited

FOREIGN PATENT DOCUMENTS

| | | |
|---|---|---|
| EP | 0068671 | 1/1983 |
| EP | 0122483 | 10/1984 |
| EP | 0185526 | 6/1986 |
| EP | 1186641 | 3/2002 |
| EP | 1412415 | 4/2004 |
| EP | 1874875 | 1/2008 |
| JP | 2005-162795 | 6/2005 |
| JP | 2007-14946 | 6/2005 |
| WO | 2008115812 | 9/2008 |

OTHER PUBLICATIONS

SIPO First Office Action issued Dec. 3, 2012 from corresponding Chinese Application No. 200980125283.X filed Jun. 30, 2009.

Wei, The Database of Outstanding Academic Dissertations for Doctorate and Master's Degree (Master), Engineering Science and Technology vol. I(2), pp. 8, 14, 15 and 26, Jun. 15, 2003.

Yimin et al., "Preparation and Hydrophobic Modification of SO2 Aerogels," Aerospace Materials & Technology, vol. 1, pp. 30-33, Dec. 31, 2006.

JPO Office Action dated Feb. 20, 2013, issued Feb. 25, 2013 from corresponding Japanese Application No. 2011-516803.

* cited by examiner

SUPERHYDROPHOBIC AEROGEL THAT DOES NOT REQUIRE PER-FLUORO COMPOUNDS OR CONTAIN ANY FLUORINE

RELATED APPLICATIONS

This application claims priority from U.S. Provisional Patent Application Ser. No. 61/077,145, filed Jun. 30, 2008, which is hereby incorporated by reference in its entirety.

GOVERNMENT RIGHTS

The present invention was developed under Contract Nos. DE-AC04-94AL85000 between Sandia Corporation and the U.S. Department of Energy and FA9550-06-C-0033 awarded by the U.S. Air Force Office of Scientific Research. The U.S. Government has certain rights in this invention.

FIELD OF THE INVENTION

The subject matter of this invention relates to protective coatings and, more particularly, to superhydrophobic coatings.

BACKGROUND OF THE INVENTION

In recent years, defense related corrosion costs have been estimated to be more than about 7% of the total annual U.S. defense cost with about 20% of the estimated corrosion related costs involving scraping and repainting steel structures. Because of the staggering costs stemming from corrosion of steel, there is a tremendous need to develop multifunctional coatings that can outperform traditional coatings. For example, the production of water-repelling hydrophobic surfaces has huge opportunities in the area of corrosion inhibition for metal components, and also in the area of chemical and biological agent protection for clothing, and many other applications. Many different approaches have been tried for achieving corrosion resistant materials. For example, a two-layer-coating can be formed on a metal component to make a corrosion resistant material. The two-layer-coating can include a hydrophobic bottom layer and a hydrophobic or super-hydrophobic top layer used to prevent water and/or salt ions from penetrating the surface of the coating. However, most superhydrophobic coatings contain fluorine which can be environmentally unfriendly and may not be cost effective to manufacture.

Thus, there is a need to overcome these and other problems of the prior art and to provide robust and inexpensive superhydrophobic coatings that does not contain fluorine.

SUMMARY OF THE INVENTION

According to various embodiments, there is a method for preparing a superhydrophobic coating. The method can include providing an ultra high water content acid catalyzed polysilicate gel formed using a first solvent, at least one alkoxy silane precursor, water, and an acid, wherein the polysilicate gel can include a three dimensional network of silica particles having surface functional groups and a plurality of pores, and wherein a fluid is disposed in the plurality of pores, the fluid including the first solvent, one or more reaction products of the acid catalyzed hydrolysis of the alkoxy silane, and un-reacted materials. The method can also include replacing the first solvent present in the plurality of pores of the polysilicate gel with a second solvent, wherein the second solvent is immiscible with the first solvent and derivatizing the surface functional groups using a silylating agent to form a surface derivatized polysilicate gel. The method can further include forming a coating solution of the surface derivatized polysilicate gel in a third solvent and applying the coating solution to a substrate surface forming a superhydrophobic coating.

In accordance with various embodiments, there is a superhydrophobic device including a substrate component and one or more superhydrophobic coatings disposed over the substrate component, wherein at least one of the one or more superhydrophobic coatings has a water contact angle of at least about 150° and a contact angle hysteresis of less than about 1°. The one or more superhydrophobic coatings can include an ultra high water content acid catalyzed polysilicate gel, the polysilicate gel including a three dimensional network of silica particles having surface functional groups derivatized with a silylating agent and a plurality of pores.

In accordance with another embodiment, there is an article including a surface, wherein the surface includes at least one region and a superhydrophobic coating disposed over the at least one region, wherein the superhydrophobic coating can have a water contact angle of at least about 150° and a contact angle hysteresis of less than about 1°. The superhydrophobic coating can include an ultra high water content catalyzed polysilicate gel, the polysilicate gel including a three dimensional network of silica particles having surface functional groups derivatized with a silylating agent and a plurality of pores.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

As used herein, the terms "hydrophobic" and "hydrophobicity" refer to the wettability of a surface (e.g., a coating surface) that has a water contact angle of approximately 85° or more. The terms "superhydrophobic" and "superhydrophobicity" refer to the wettability of a surface (e.g., a coating surface) that has a water contact angle of approximately 150° or more and very low contact angle hysteresis ($\Delta\theta=\theta_A-\theta_B<1$). Typically, on a hydrophobic surface, for example, a 2-mm-diameter water drop beads up but does not run off the surface when the surface is tilted moderately. As the surface is tilted, the wetting angle at the downhill side of the droplet increases, while the wetting angle at the uphill side of the droplet decreases. Since it is difficult for the advancing (downhill) interface to push forward onto the next increment of solid surface and it is difficult for the receding (uphill) interface to let go of its bit of solid surface, the droplet tends to remain stationary or pinned in place. A hydrophobic surface is described as having a low contact angle hysteresis if the difference between advancing and receding contact angles is less than 1°.

Figure 1:
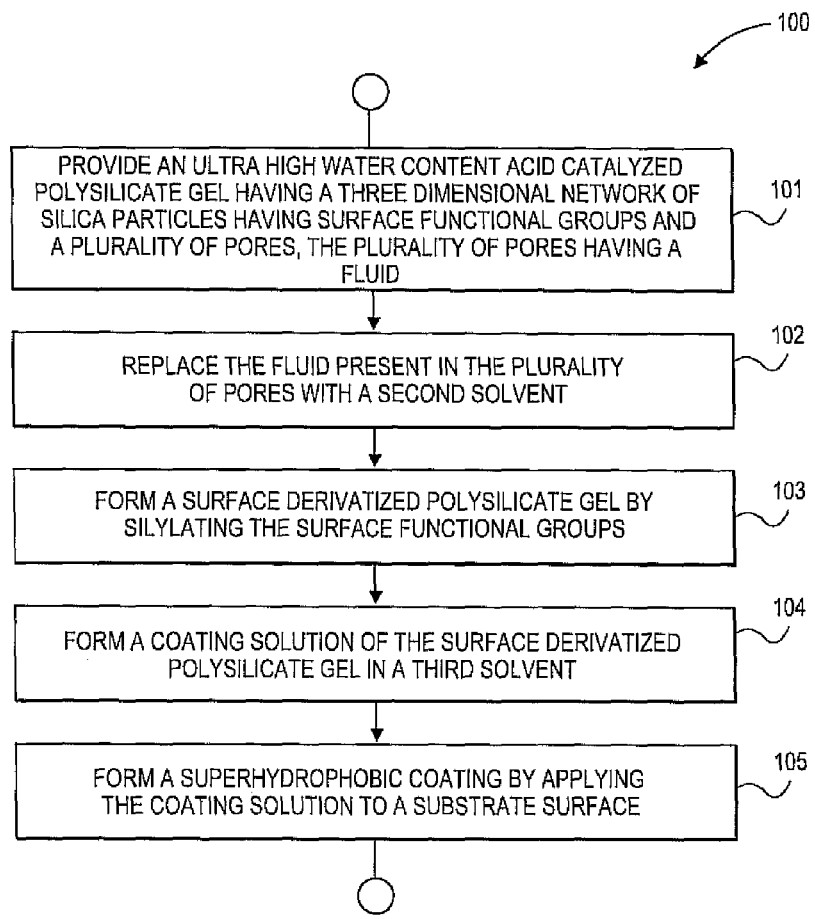
FIG. 1 shows a method for preparing a superhydrophobic coating in accordance with the present teachings.
Figure 2:
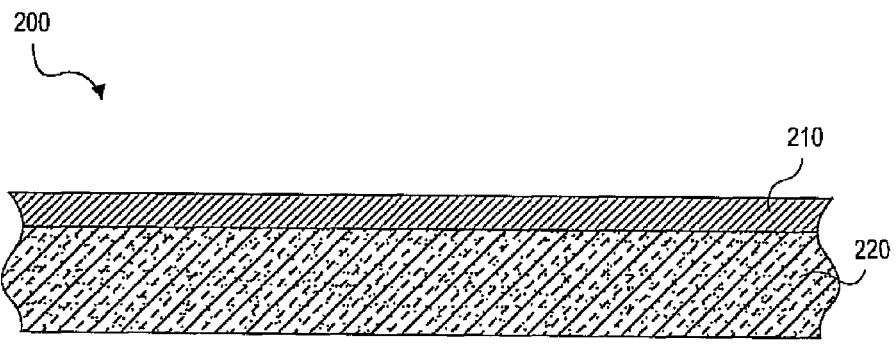
FIG. 2 schematically illustrates a cross section of a portion of an exemplary superhydrophobic coating in accordance with the present teachings.
Figure 3:
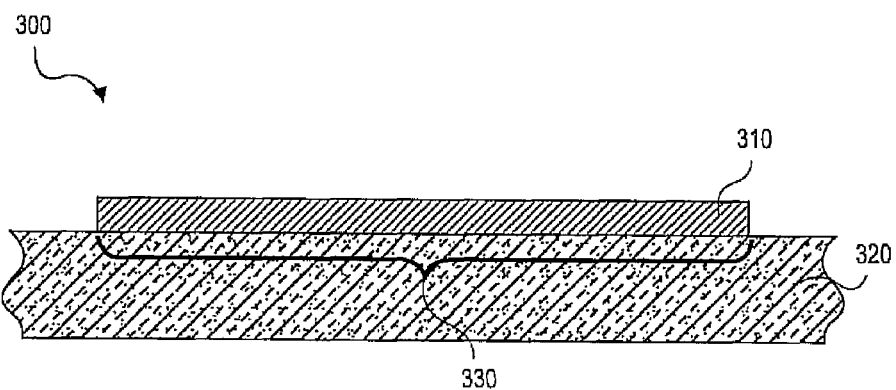
FIG. 3 schematically illustrates a cross section of a portion of an exemplary article in accordance with the present teachings.

In accordance with various embodiments of the present teachings, FIG. 1 shows an exemplary method 100 for preparing a superhydrophobic coating, for example, exemplary superhydrophobic coatings 210 and 310 shown in FIGS. 2 and 3. The method 100 can include a step 101 of providing an ultra high water content acid catalyzed polysilicate gel formed using a first solvent, at least one alkoxy silane precursor, water, and an acid, wherein the polysilicate gel can include a three dimensional network of silica particles having surface functional groups and a plurality of pores. In various embodiments, a fluid can be disposed in the plurality of pores. Exemplary fluid can include, but are not limited to, the first solvent, one or more reaction products of the acid catalyzed hydrolysis of the alkoxy silane, and un-reacted materials such as, for example, alkoxy silane precursor.

In various embodiments, the alkoxy silane precursor can be organically modified silane monomers having a general formula of, for example, $(R')_xSi(OR)_{4-x}$, wherein x can be 1 or 2 and R and R' can be the same or different and can include an organic group, such as, for example, an alkyl, an alkenyl, an alkynyl, an aryl group, or combinations thereof. The alkoxy silane precursor can include one or more silane compounds including, but not limited to, methyltrimethoxy silane, vinyltrimethoxy silane, dimethyldiethoxy silane, methacryloxypropyltrimethoxy silane, mercaptopropyltrimethoxy silane, chloropropyltrimethoxy silane, bromopropyltrimethoxy silane, iodopropyltrimethoxy silane, and chloromethyltrimethoxy silane, tetraethoxysilane, tetramethoxysilane, and 1,2-bis(triethoxysilyl)ethane. In some embodiments, the first solvent can be any suitable liquid such as, for example, methanol, ethanol, and any organic solvent at least partially miscible with water. In other embodiments, the acid can be any suitable acid such as, for example, 1.0 N hydrochloric acid and any other source of hydrogen ions.

In certain embodiments, the step 101 of providing an ultra high water content acid catalyzed polysilicate gel can include forming a polysilicate gel using a first solvent, at least one alkoxy silane precursor, water, and an acid, such that a molar ratio of water to alkoxy silane precursor can be in the range of about 10 to about 80, which leads to the distinction of 'ultra high water' content. In some embodiments the molar ratio of water to alkoxy silane precursor can be greater than about 80. In various embodiments, the polysilicate gel can be formed by first adding the first solvent to the alkoxy silane precursor, followed by the addition of water and the acid to form a reaction mixture. The reaction mixture can then be agitated and placed at a temperature in the range of about 15° C. to about 80° C. for a period of approximately 1 day to approximately 90 days, and in some cases by placing the reaction mixture at a temperature in the range of about 40° C. to about 60° C. for a period of approximately 3 days to approximately 10 days. Upon the completion of the reaction, the polysilicate gel can be rather firm and can have appearance from transparent to opaque depending upon the first solvent used. The polysilicate gel should not be loose at this stage; tapping the bottom of the reaction vessel should result in a reverberation throughout the polysilicate gel. Excess water and higher levels of acid catalyst can render the hydrolysis portion of the synthesis the dominating process and limiting the condensation. U.S. Patent Application Publication No. 20080113188 and Master's thesis of David J. Kissel entitled, "Mechanical property characterization of sol-gel derived nanomaterials using an acoustic wave technique", May 2007, describe in detail the sol-gel method of forming a silica gel, the disclosures of which are incorporated by reference herein in their entirety.

The method 100 for preparing a superhydrophobic coating can further include a step 102 of replacing the fluid disposed in the plurality of pores of the polysilicate gel with a second solvent. In various embodiments, the step 102 of replacing the fluid disposed in the plurality of pores of the polysilicate gel with a second solvent can include breaking up the ultra high water content acid catalyzed polysilicate gel to form a broken gel and adding a second solvent to the broken gel. Any suitable solvent immiscible with the first solvent can be used as the second solvent, such as, for example, hexane. The broken gel in the second solvent can be kept at a temperature in the range of about 40° C. to about 60° C. for at least about 30 minutes to allow solvent exchange. And finally excess of the second solvent and the fluid can be removed from the broken gel. These steps can be repeated at least once, preferably thrice to allow replacement of most of the fluid disposed in the plurality of pores of the polysilicate gel. Fresh second solvent can be added to the polysilicate gel before storing in a cold storage at a temperature of less than about 10° C.

The method 100 for preparing a superhydrophobic coating can further include a step 103 of derivatizing the surface functional groups of the polysilicate gel using one or more silylating agents to form a surface derivatized polysilicate gel. In various embodiments, the step 103 of derivatizing the surface functional groups of the polysilicate gel can include gradually adding a silylating agent adding to the polysilicate gel due to silylation reaction being exothermic in nature. Any suitable silane can be used as the silylating agent, such as, for example, trimethylchlorosilane, trichloromethylsilane, trichlorooctylsilane, hexamethyldisilazane, and any reactive silane including at least one hydrophobic ligand. Silylation reaction may also result in bubbling of the solvent and once the bubbling stops, the polysilicate gel can be stored in the silylating agent at a temperature in the range of about 40° C. to about 60° C. for about 6 hours to about 10 hours to form a surface derivatized polysilicate gel and an excess of the silylating agent can be removed. While not intending to be bound by any specific theory, it is believed that the second solvent helps in the transport of the silylating agent for reaction with the surface functional groups, such as, for example, surface hydroxyl moieties of the polysilicate gel.

The method 100 of preparing a superhydrophobic coating can further include a step 104 of forming a coating solution of the surface derivatized polysilicate gel in a third solvent. In various embodiments, the step 104 of forming a coating solution of the surface derivatized polysilicate gel in a third solvent can include washing the surface derivatized polysilicate gel with an excess of second solvent and washing the surface derivatized polysilicate gel with a third solvent at least twice before adding the third solvent to the surface derivatized polysilicate gel to form a coating solution. In certain embodiments, the step 104 of forming a coating solution can also include sonicating the surface derivatized polysilicate gel to break up aggregates and redispersing the surface derivatized polysilicate gel in the third solvent. Any suitable third solvent can be used, such as, for example, ethanol. In some embodiments, the third solvent can be the same as the first solvent. The method 100 of preparing a superhydrophobic coating can further include a step of 105 of forming a superhydrophobic coating by applying the coating solution to a substrate using any suitable technique, such as, for example, dip coating, brush coating, roller coating, spray coating, spin coating, casting, and flow coating. Any suitable material can be used for the substrate surface, such as, for example, metal, silicon wafers, glass, ceramics, plastics, and fabrics.

FIG. 2 schematically illustrates a cross section of a portion of an exemplary superhydrophobic device 200, in accordance with various embodiments of the present teachings. The exemplary superhydrophobic device 200 can include a substrate component 220 and one or more superhydrophobic coatings 210 disposed over the substrate component 220, wherein at least one of the one or more superhydrophobic coatings has a water contact angle of at least about 150° and a contact angle hysteresis of less than about 1°. Any suitable material can be used for the substrate component such as, for example, a metal, a silicon wafer, a glass, a ceramic, a plastic, and a fabric. In various embodiments, each of the one or more superhydrophobic coatings can include an ultra high water content acid catalyzed polysilicate gel, wherein the polysilicate gel can include a three dimensional network of silica particles having surface functional groups derivatized with a silylating agent and a plurality of pores. Exemplary silylating agent can include, but are not limited to, trimethylchlorosilane, trichloromethylsilane, trichlorooctylsilane, hexamethyldisilazane, or any reactive silane including at least one hydrophobic ligand. In some embodiments, each of the one or more superhydrophobic coatings 210 can be the same in terms of chemical composition and thickness. In embodiments, at least one of the one or more superhydrophobic coatings 210 can be different in terms of chemical composition and thickness. In various embodiments, each of the one or more superhydrophobic coatings can have a thickness from about 0.2 µm to about 3 µm.

In certain embodiments, at least one of the one or more superhydrophobic coatings can resists corrosion for about 1800 hours or longer. In some other embodiments, at least one of the one or more superhydrophobic coatings can be used as an anti-icing coating, a defogging coating, an anti-microbial coating, a stain resistant coating, or a drag reduction coating in water environment.

FIG. 3 schematically illustrates a cross section of a portion of an exemplary article 300, in accordance with various embodiments of the present teachings. The exemplary article 300 can include a surface 320, the surface 320 including at least one region 330 and a superhydrophobic coating 310 disposed over the at least one region 330, wherein the superhydrophobic coating has a water contact angle of at least about 150° and a contact angle hysteresis of less than about 1°. Any suitable material can be used for the at least one region 330 of the surface 320, including, but not limited to, a metal, a silicon wafer, a glass, a ceramic, a plastic, and a fabric. In various embodiments, the superhydrophobic coating 320 can include an ultra high water content acid catalyzed polysilicate gel, wherein the polysilicate gel can include a three dimensional network of silica particles having surface functional groups derivatized with a silylating agent and a plurality of pores. Exemplary silylating agent can include, but are not limited to, trimethylchlorosilane, trichloromethylsilane, trichlorooctylsilane, hexamethyldisilazane, or any reactive silane including at least one hydrophobic ligand. In various embodiments, the superhydrophobic coating 310 can have a thickness from about 0.2 µm to about 3 µm.

In certain embodiments, the superhydrophobic coating 320 can resist corrosion for about 1800 hours or longer. In various embodiments, the exemplary article 300 can include, but is not limited to an antenna, a window, an automobile, an aircraft, a building, a textile, a boat, a partially and/or fully submerged structure in water and the superhydrophobic coating 320 can be used for a wide variety of applications, including, but not limited to, anti-icing coating, a defogging coating, an anti-microbial coating, a stain resistant coating, and a drag reduction coating in water environment.

Like similar sol-gel based coatings that are water repellent, the superhydrophobic coatings 210, 310 as disclosed herein are prepared in a similar manner to other thin film aerogels. However, it is the surface chemistry i.e. alkyl silyl moieties (derivatized surface functional groups) of the superhydrophobic coatings 210, 310 that are responsible for the inherent material roughness and super water repellency. This attribute makes the superhydrophobic coatings 210, 310 of the present disclosure less costly and renders them safe for biological applications. Also, by not utilizing fluoro-alkyl silanes and similar fluorinated reagents in the manufacture of the superhydrophobic coatings 210, 310 of the present disclosure, the superhydrophobic coatings 210, 310 and the method 100 of making them are environmentally friendly. Other features of the superhydrophobic coatings 210, 310 of the present disclosure are low refractive index in the range of about 1.06 to about 1.08 at about 600 nm and optical clarity.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Example 1

Formation of a Superhydrophobic Coating

TABLE 1

| Material Name | vol. fraction | for 100 mL gel volume |
|---|---|---|
| Methanol | 0.0832 vol/vol | 8.32 ml |
| Tetramethylorthosilicate (TMOS) | 0.0989 vol/vol | 9.89 ml |

TABLE 1-continued

| Material Name | vol. fraction | for 100 mL gel volume |
|---|---|---|
| Dionized Water | 0.8155 vol/vol | 81.55 ml |
| 1.0N Hydrochloric Acid (HCl) | 0.0024 vol/vol | 0.24 ml |

Combined the reagents given in Table 1 in the order they are listed. Agitated the reaction mixture and placed at about 50° C. for a period of approximately 120 hours. Upon the completion of the reaction, the gel had an opaque appearance and was rather firm. Tapping the bottom of the reaction vessel resulted in a reverberation throughout the gel. Broke up the gel with a clean utensil (e.g. stir rod, spatula, etc.) and added approximately 100 ml of hexane to the broken gel in the reaction vessel. Allowed solvent exchange for at least 30 minutes at about 50° C. After the solvent exchange period, removed excess hexane with a glass pipet and/or syringe and repeated the hexane wash at least once more. After draining excess hexane, the gel was placed in cold storage in fresh hexane. Added approximately 50 ml of trimethylchlorosilane (TMCS) (also referred to as chlorotrimethylsilane) in about 8 ml to about 12 ml increments to the gel gradually due to the reaction's exothermic nature. As soon as the bubbling stopped, the reaction vessel was closed and placed at about 50° C. for at least about 8 hours. Removed the excess TMCS with a glass pipet and washed with excess hexane (approximately 100 ml). Repeated the hexane washing at least once more. After removal of excess hexane, washed with excess ethanol (approximately 100 ml) as was done with hexane and repeat at least once prior to solution preparation. Removed excess ethanol from the last washing step and added ethanol at a volume appropriate for the desired thickness of the superhydrophobic coating. Thickness of various superhydrophobic coatings formed by spin-coating at about 2000 rpm for about 30 sec and heat treated at about 100° C. for about 15 minutes are given in table 2. It should be noted that dip-coating or spray-coating can result in much thicker superhydrophobic coatings.

TABLE 2

| Wet Gel volume: Ethanol Volume | Thickness Range |
|---|---|
| 1:1 | >1 μm |
| 1:2 | 800 nm to 1 μm |
| 1:3 | 200 nm to 500 nm |
| 1:4 | >200 nm |

One of the exemplary superhydrophobic coatings had a thickness of about 369.47 nm and a refractive index of about 1.0782 at about 600 nm.

While the invention has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A superhydrophobic device comprising:
a substrate component; and
one or more superhydrophobic coatings disposed over the substrate component, wherein the one or more superhydrophobic coatings comprises an ultra high water content acid catalyzed polysilicate gel, the polysilicate gel comprising a three dimensional network of silica particles having surface functional groups derivatized with a silylating agent and a plurality of pores,
wherein at least one of the one or more superhydrophobic coatings has a water contact angle of at least about 150° and a contact angle hysteresis of less than about 1°.

2. The superhydrophobic device of claim 1, wherein the substrate component comprises at least one of a metal, a silicon wafer, a glass, a ceramic, a plastic, and a fabric.

3. The superhydrophobic device of claim 1, wherein the silylating agent comprises one or more of trimethylchlorosilane, trichloromethylsilane, trichlorooctylsilane, hexamethyldisilazane, and any reactive silane comprising at least one hydrophobic ligand.

4. The superhydrophobic device of claim 1, wherein each of the one or more superhydrophobic coatings has a thickness in the range of about 0.2 μm to about 3 μm.

5. The superhydrophobic device of claim 1, wherein at least one of the one or more superhydrophobic coatings is used as at least one of anti-icing coating, a defogging coating, an anti-microbial coating, a stain resistant coating, and a drag reduction coating in water environment.

6. The superhydrophobic device of claim 1, wherein at least one of the one or more superhydrophobic coatings resists corrosion for about 1800 hours or longer.

7. An article comprising:
a surface, wherein the surface comprises at least one region; and
a superhydrophobic coating disposed over the at least one region, wherein the superhydrophobic coating comprises an ultra high water content catalyzed polysilicate gel, the polysilicate gel comprising a three dimensional network of silica particles having surface functional groups derivatized with a silylating agent and a plurality of pores,
wherein the superhydrophobic coating has a water contact angle of at least about 150° and a contact angle hysteresis of less than about 1°.

8. The article of claim 7, wherein the silylating agent is selected from the group consisting of trimethylchlorosilane, trichloromethylsilane, trichlorooctylsilane, hexamethyldisilazane, and any reactive silane comprising at least one hydrophobic ligand.

9. The article of claim 7, wherein the superhydrophobic coating has a thickness in the range of about 0.2 μm to about 3 μm.

10. The article of claim 7, wherein the superhydrophobic coating resists corrosion for about 1800 hours or longer.

11. The article of claim 7, wherein the superhydrophobic coating is used for at least one of anti-icing coating, a defogging coating, an anti-microbial coating, a stain resistant coating, and a drag reduction coating in water environment.

12. The article of claim 7, wherein the article comprises at least one of an antenna, a window, an automobile, an aircraft, a building, a textile, a boat, a partially and/or fully submerged structure in water.

\* \* \* \* \*